United States Patent [19]

Duel

[11] 4,256,279
[45] Mar. 17, 1981

[54] POWERED GIMBAL SYSTEM

[75] Inventor: Don M. Duel, Phoenix, Ariz.

[73] Assignee: Motorola, Inc., Schaumburg, Ill.

[21] Appl. No.: 957,588

[22] Filed: Nov. 3, 1978

[51] Int. Cl.³ .......................................... F16M 11/12
[52] U.S. Cl. ...................................... 248/184; 74/5.22
[58] Field of Search ............... 248/184, 178, 179, 182, 248/183, 671, 675, 678, 676; 343/882, 757; 108/4, 20; 74/5.47, 5.22; 318/625, 575, 688

[56] References Cited

U.S. PATENT DOCUMENTS

| | | | |
|---|---|---|---|
| 1,840,104 | 1/1932 | Anschutz-Kaempfe | 74/5.47 X |
| 2,258,186 | 10/1941 | McNary et al. | 343/757 X |
| 2,440,897 | 5/1948 | Hammarstrom | 248/676 X |
| 2,501,479 | 3/1950 | Sproule | 74/5.22 X |
| 2,542,975 | 2/1951 | Adkins | 74/5.47 |
| 2,605,072 | 7/1952 | Klein et al. | 248/184 |
| 2,945,414 | 7/1960 | Blackstone | 248/182 X |
| 3,005,352 | 10/1961 | Claret | 74/5.22 X |
| 3,069,112 | 12/1962 | Patterson | 343/757 X |
| 3,163,039 | 12/1964 | Newman et al. | 248/184 X |
| 3,415,126 | 12/1968 | Thomason et al. | 74/5.47 |
| 3,527,435 | 9/1970 | Lapp et al. | 248/184 |
| 4,068,538 | 1/1978 | Butler et al. | 74/5.22 |

FOREIGN PATENT DOCUMENTS

| | | | |
|---|---|---|---|
| 500694 | 3/1954 | Canada | 248/671 |
| 633942 | 12/1949 | United Kingdom | 74/5.47 |

*Primary Examiner*—Rodney H. Bonck
*Attorney, Agent, or Firm*—M. David Shapiro; Eugene A. Parsons

[57] ABSTRACT

A gimbal system utilizing two torque motor drives wherein the motors are on the drive axes and whose rotors and cases provide the gimbal structure for increased off boresite capability (look angle), faster response time due to reduced inertia, low swept volume and low cost based on the simplicity of the structure.

5 Claims, 4 Drawing Figures

POWERED GIMBAL SYSTEM

This invention was made under contract to the U.S. Air Force.

FIELD OF THE INVENTION

The invention relates to a simplified gimbal system for a platform such as one which might be used to point an antenna or an optical system in a target seeking missile system.

BACKGROUND OF THE INVENTION

Gimbal systems for contemporary seeker missile use have progressed beyond classic two ring gimbal systems. The demands for fast response time, wide look angles, low cost, low swept volume and accuracy have been met by systems such as the one described in "STABILIZED PLATFORM SYSTEM" U.S. Pat. No. 4,068,538 by Butler et al. and "OBLIQUE AXIS SEEKER", patent application Ser. No. 943,598 by Reid, both assigned to the assignee of the instant invention. Each of these systems has contributed to the state of the art in terms of operating capabilities and low cost implementation. The Butler et al. system, supra, utilizes a complex of coupling devices and structure to support the platform. Each of these components contributes off center mass which increases the inertia of the system. The component count is relatively high which tends to decrease reliability, decrease useable servo system bandwidth and to increase cost of fabrication and assembly. The swept volume of this system is very low, however.

The Reid system, supra, employs substantially non-orthogonal axes to accomplish continuous motor operation without need for motor reversal in a search or sweep mode of operation. However, this system also suffers from high inertia due to the geared linkage and, in some configurations, it may be prone to gimbal lock-up within a desired range of "look" angles. The non-orthogonal axes configuration requires a complex mathematical conversion for operating an X/Y axis control fin system.

SUMMARY OF THE INVENTION

These and other problems are resolved by means of the instant invention which employs drive motors on orthogonal axes. The drive motors are coupled case to case, case to rotor or rotor to rotor to provide two dimensional control of a platform for carrying an antenna, optics or the like.

It is therefore an object of the invention to provide a driven gimbal system with a small swept volume.

It is another object of the invention to provide a driven gimbal system having a low moment of inertia.

It is still another object of the invention to provide a low cost driven gimbal system.

It is yet another object of the invention to provide a driven gimbal system which does not exhibit gimbal lock-up when in a boresite position.

It is still another object of the invention to provide a high reliability driven gimbal system.

It is again another object of the invention to provide a driven gimbal system having wide servo bandwidth.

These and other objects of the invention will become more readily understood upon reading of the Detailed Description of the Invention in conjunction with the drawings in which:

FIG. 1 is a three dimensional view of a preferred case-to-case embodiment of the invention, FIG. 2 is a view of a modification of the case-to-case preferred embodiment of FIG. 1, FIG. 3 is a three dimensional view of another embodiment of the invention employing a rotor-to-case configuration, and FIG. 4 is a view of still another embodiment of the invention employing a rotor-to-rotor configuration.

DETAILED DESCRIPTION OF THE INVENTION

Figure 1:
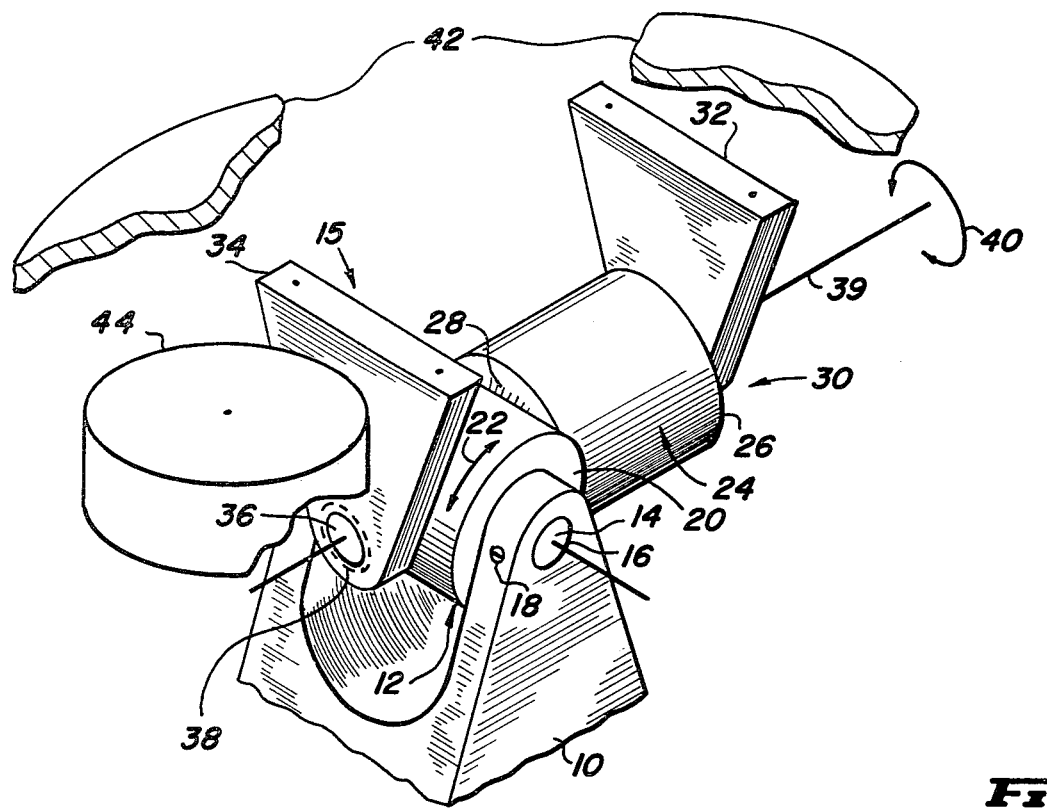

FIG. 1 represents the preferred embodiment of the invention. Pedestal 10 is fitted with motor 12. Rotor shaft 14 is fixed to pedestal 10 at hole 16 by set screw 18. A dummy shaft 15 (not shown) may be journaled between motor 12 and pedestal 10 by means of a bearing or the motor rotor may employ a double ended shaft. Since shaft 14 is fixed to pedestal 10, shaft 14 cannot rotate with respect to pedestal 10. When motor 12 is energized, case 20 of motor 10 rotates as shown at arrows 22. Motor 24 has case 26 which is fixed to case 20 of motor 12, for example, by means of welding 28. Alternatively, the two motor cases may be fabricated as a single part. Rotor shaft 30 of motor 24 is fixed to platform support 32. Platform support 34 is connected to motor 12 case 20 by means of dummy shaft 36 and idler bearing 38. Dummy shaft 36 and motor 24 rotor shaft 30 share common axis 39. When motor 24 is energized, shaft 30 rotates as shown at arrows 40. Since shaft 30 is fixed to platform support 32 by a set screw or other means (not shown), support 32 rotates about axis 39 with shaft 30 and drives platform 42 which is fixed to supports 32, 34. The configuration as described provides for non-symmetrical mounting of platform 42 on supports 32 and 34. This allows space for mounting, for example, gyroscope 44 on the underside of platform 42. While the axes of motor 12 and motor 24 are preferably orthogonal, it is not necessary to the operation of the invention and in some applications the axes may not be orthogonal.

Figure 2:
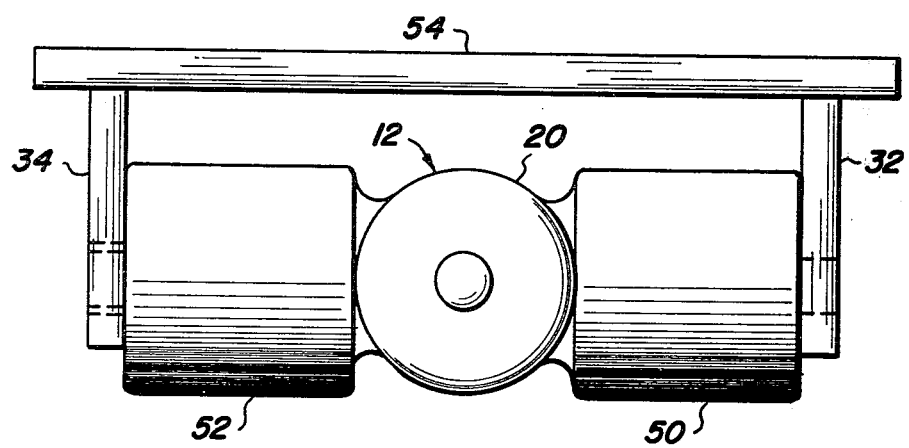

An alternative preferred embodiment of the invention is illustrated in FIG. 2. Motor 12 is basically the same as that of FIG. 1. The function of motor 24 of FIG. 1 is accomplished by motors 50 and 52 which have their cases fixed to case 20 of motor 12. Alternatively, either of motors 50, 52 may be a dummy unit having an internally or externally journaled shaft for free rotation. Mounts 32 and 34 are the same and serve the same function as those identically referenced items in FIG. 1. The configuration of FIG. 2 provides a symmetrical mount for platform 54 which may be a mount for a sensor such an an antenna or optical device. The pedestal for motor 12 of FIG. 2 is not shown for clarity but would be similar to or identical with that of pedestal 10 of FIG. 1. The configurations of the invention disclosed in FIGS. 1 and 2 may be referred to as "case-to-case" configurations since the cases of the drive motors are each fixed to another.

Figure 3:
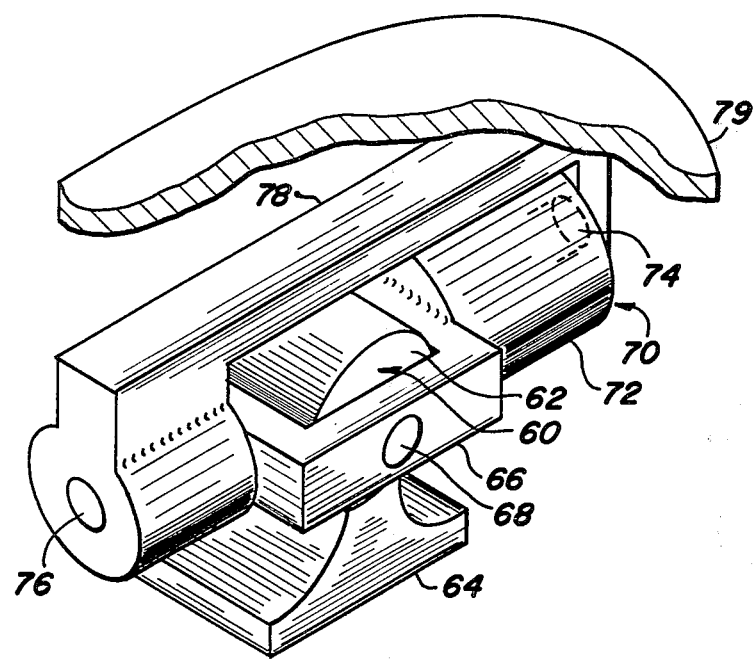

FIG. 3 shows another embodiment of the invention which illustrates a "shaft-to-case" or "rotor-to-case" configuration. Case 62 of motor 60 is fixed to pedestal 64. Frame 66 is disposed about motor 60 and is fixed to rotor shaft 68 of motor 60 in two places; i.e., motor 60 has double ended rotor shaft 68. Frame 66 is also fixed to motor 70 case 72, as shown. Frame 78 is fixed to rotor shaft 74 of motor 70 and is journaled to dummy shaft 76, which may be a part of frame 66. Frame 78 may be a part of or be used to mount a sensor such as antenna or optical device 79.

The configuration of FIG. 3 may be adapted to a "case-to-shaft" configuration (not shown) wherein case 62 of motor 60 mounts sensor 79 and frame 78 becomes the equivalent of a pedestal for the system.

Figure 4:
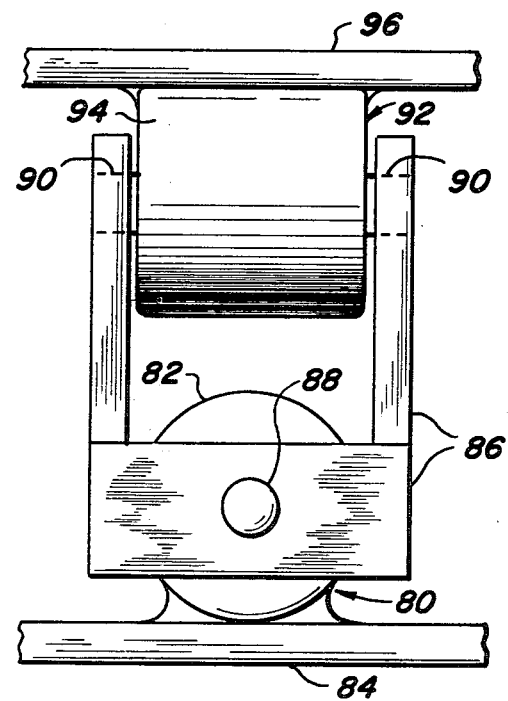

Another of the configuration combinations, a "shaft-to-shaft" arrangement, is illustrated in FIG. 4. Motor 80 has case 82 fixed to pedestal or base 84. Frame 86 surrounds motor 80 and is fixed to motor 89 drive shaft 88 in at least one place. Frame 86 also extends and is fastened to rotor shaft 90 of motor 92. Motor 92 case 94 is connected to platform 96 for carrying or mounting an antenna or optical device.

In each of FIGS. 1, 2 and 3 the two motor axes are in a single plane. FIG. 4 shows the axes which are not in a single plane. It will be obvious that any of the configurations of FIGS. 1, 2, 3 or 4 may or may not have motor axes in a single plane.

In operation, each of all configurations of the invention are alike in that at least one drive motor is mounted on a first axis and at least one other drive motor is mounted on a second axis. The axes may or may not be coplanar or orthogonal, but they may not be parallel. The first drive motor(s) operates to rotate the system about the first axis and the second drive motor(s) operate to drive the system about the second axis. All motors are mounted within or very close to the swept volume of the platform. This keeps the assembly of the invention within a very compact total volume and positions all moving parts very close to the axes of rotation for minimum inertial effect. This, in turn, provides very good response time and/or may be used to reduce torque requirements for the system.

Each of the configurations shown allow for direct motor drive, thus eliminating many drive elements which might introduce backlash or free play problems or elastic effects which may reduce effective system bandwidth.

While the invention has been particularly shown and described with reference to a preferred and other embodiments thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

What is claimed is:

1. Gimbal apparatus having at least a first and a second gimbal axis for allowing mechanical freedom for a platform and for driving the platform to a desired direction with respect to a pedestal, the apparatus comprising:
    a first drive motor having a case and a rotor, said case and said rotor of said first drive motor having a first common axis, one of said case and said rotor of said first drive motor being fixed to the pedestal, the other of said case and said rotor of said first drive motor being a first rotatable member with respect to said one of said case and said rotor of said first drive motor, said first rotatable member providing a rotatable output from said first drive motor; and
    a second drive motor having a case and a rotor, said case and said rotor of said second drive motor having a second common axis, said second common axis of said case and said rotor of said second drive motor and said first common axis of said case and said rotor of said first drive motor having an angle greater than zero therebetween, one of said case and said rotor of said second drive motor being fixed to said first rotatable member, the other of said case and said rotor of said second drive motor being a second rotatable member with respect to said one of said case and said rotor of said second drive motor, said second rotatable member providing a rotatable output from said second drive motor, said second rotatable member being fixed to the platform, said first and second common axes having essentially a point of intersection therebetween, said point of intersection lying within one of said first and second drive motors and said first and second common axes being respectively common with the first gimbal axis and the second gimbal axis.

2. The apparatus according to claim 1 wherein said pedestal comprises at least one supporting member and said one of said case and said rotor is fixed to said supporting member.

3. The apparatus according to claim 1 wherein said pedestal comprises at least two supporting members and said one of said case and said rotor is fixed to at least one of said two supporting members.

4. The apparatus according to claim 3 wherein at least said first drive motor is located between said at least two support members.

5. The apparatus according to claim 1, 2, 3 or 4 wherein said angle between said axes is essentially ninety degrees.

* * * * *